United States Patent
Lai et al.

(10) Patent No.: US 7,385,896 B2
(45) Date of Patent: Jun. 10, 2008

(54) FOCUSING CONTROLLER APPARATUS AND METHOD FOR AN OPTICAL DISK DRIVE

(75) Inventors: Yi-Lin Lai, Taipei (TW); Chin-Yin Tsai, Taipei (TW)

(73) Assignee: Tian Holdings, LLC, Wilmington, DE (US)

( * ) Notice: Subject to any disclaimer, the term of this patent is extended or adjusted under 35 U.S.C. 154(b) by 532 days.

(21) Appl. No.: 10/990,665

(22) Filed: Nov. 17, 2004

(65) Prior Publication Data

US 2005/0105415 A1 May 19, 2005

Related U.S. Application Data

(60) Provisional application No. 60/520,711, filed on Nov. 17, 2003.

(51) Int. Cl.
G11B 7/00 (2006.01)

(52) U.S. Cl. .................... 369/53.23; 369/44.29; 369/44.34

(58) Field of Classification Search ............ None
See application file for complete search history.

(56) References Cited

U.S. PATENT DOCUMENTS

| | | | |
|---|---|---|---|
| 4,512,004 A | 4/1985 | Nonaka | |
| 4,707,816 A * | 11/1987 | Yonezawa et al. | 369/44.13 |
| 4,878,211 A | 10/1989 | Suzuki et al. | |
| 5,029,155 A | 7/1991 | Kenjo | |
| 5,216,659 A | 6/1993 | Call et al. | |
| 5,245,598 A | 9/1993 | Burroughs | |
| 5,367,513 A | 11/1994 | Bates et al. | 369/44.29 |
| 5,623,465 A * | 4/1997 | Sasaki et al. | 369/44.32 |
| 5,710,748 A | 1/1998 | Hofer | 369/44.35 |
| 5,732,052 A * | 3/1998 | Ando | 369/44.29 |

FOREIGN PATENT DOCUMENTS

| | | |
|---|---|---|
| CN | 1407552 | 4/2003 |
| JP | 63117336 | 5/1988 |
| JP | 2001067682 A * | 3/2001 |

OTHER PUBLICATIONS

Machine translation of Okamatsu, JP 10-083540, published Mar. 31, 1998.*

* cited by examiner

Primary Examiner—William Korzuch
Assistant Examiner—Peter Vincent Agustin
(74) Attorney, Agent, or Firm—Perkins Coie LLP

(57) ABSTRACT

A focusing controller and the method thereof for an optical disk drive. The focusing controller includes a filter, a coupler and a focus compensator. The filter filters out a high-frequency component of the track error signal and derives an adjusted signal, while the coupler eliminates the adjustment signal from the focusing error signal so as to generate a coupled signal. The focus compensator generates a focus control signal used for controlling a position of the pick up head of the optical disk drive according to the coupled signal during a focusing operation.

6 Claims, 2 Drawing Sheets

FOCUSING CONTROLLER APPARATUS AND METHOD FOR AN OPTICAL DISK DRIVE

This application claims the benefit of U.S. provisional application Ser. No. 60/520,711, filed Nov. 17, 2003, the subject matter of which is incorporated herein by reference.

BACKGROUND OF THE INVENTION

1. Field of the Invention

The invention relates in general to a focusing controller and the method thereof, and more particularly to a focusing controller and the method thereof used in an optical disk drive.

2. Description of the Related Art

Focus error signal Fe is used to adjust the position of pick up head of an optical disk drive so as to focus the laser beam emitted by the pick up head onto a currently loaded optical disk. FIG. 1 is a block diagram showing a convention optical disk drive 100, which includes a focusing controller 120 and a pick up head 110 used for accessing an optical disk 130. After the focus error signal Fe being derived according to the reflected light from the optical disk 130, the focusing controller 120 outputs a focus control signal Foo to control the pick up head 110 according to the focus error signal Fe.

FIG. 2 is a block diagram showing the focusing controller used conventionally, which basically includes an analog-to-digital converter (A/D converter) 210, a focus compensator 220 and a digital-to-analog converter (D/A converter) 230. The A/D converter 210 receives and digitizes the focus error signal Fe and delivers a digital focus error signal to the focus compensator 220. The D/A converter 230 then converts signal at the output terminal of the focus compensator 220 to generate required focus control signal Foo for controlling the position of the pick up head 110.

However, noises inside the optical disk drive affect the servo signals, including the focus error signal, so that the laser beam cannot precisely focus on the optical disk. There includes a plurality of tracks having pits and lands thereon used to record information on the surface of an optical disk. However, the focus error signal Fe is easily coupled with the track error signal Te during tracking operations, which indicates that the pickup head may not be allocated at an accurate position during the following focusing operations since the currently derived focus error signal Fe is erroneous because of coupling low-frequency error component from the track error signal Te. FIG. 3 shows waveform diagrams of the track error signal Te and the focus error signal Fe during tracking operations. Obviously, the focus error signal Fe is usually coupled with the low-frequency component of the track error signal Te such that the actually focus status of the pickup head may not obtained due to an erroneous Fe is derived.

SUMMARY OF THE INVENTION

It is therefore an object of the invention to provide an apparatus and method of focusing control in an optical disk drive so as to focus the laser beam precisely on the surface of an optical disk.

The invention achieves the above-identified object by providing a focusing controller of an optical disk drive. The focusing controller includes a filter used to eliminate a high-frequency component of the track error signal and then output an adjustment signal, a coupler which eliminates the adjustment signal from the tracking error signal and thus generates a coupled signal, and a focus compensator which derives a focus control signal used for controlling the pick up head of the optical disk drive according to the coupled signal.

The invention achieves another above-identified object by providing a focusing control method for receiving a track error signal and a focus error signal from a pick up head of an optical disk drive and outputting a focus control signal to control the pick up head. The method includes the following steps. First, a high-frequency component of the track error signal is filtered so as to derive an adjustment signal. A coupled signal is then derived by eliminating the adjustment signal from the focusing error signal. Thereafter, a focus control signal is derived according to the coupled signal.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 4:
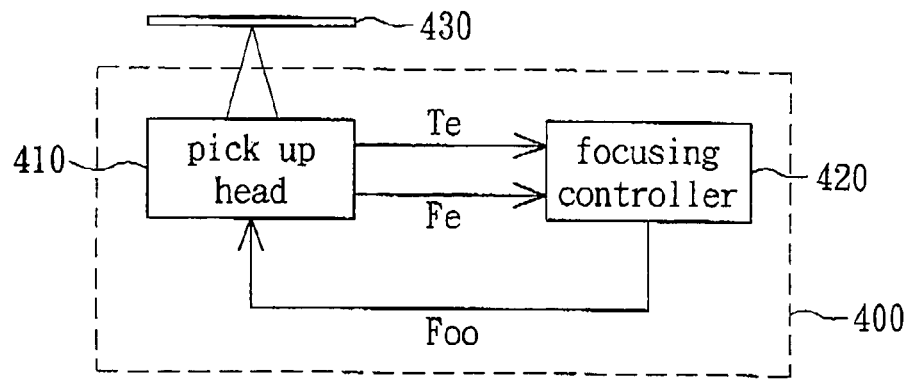
FIG. 4 is a schematic diagram of an optical disk drive according to a preferred embodiment of the invention.

FIG. 4 is a diagram of an optical disk drive according to a preferred embodiment of the invention. The optical disk drive 400 includes a focusing controller 420 and a pick up head 410 used for accessing an optical disk 430. The track error signal Te and the focus error signal Fe are derived according to the reflected light from the optical disk 430. The focusing controller 420 feeds back a focus control signal Foo according to the track error signal Te and the focus error signal Fe to the pick up head 410 so as to control the position of the pick up head 410 during focusing operations.

Figure 5:
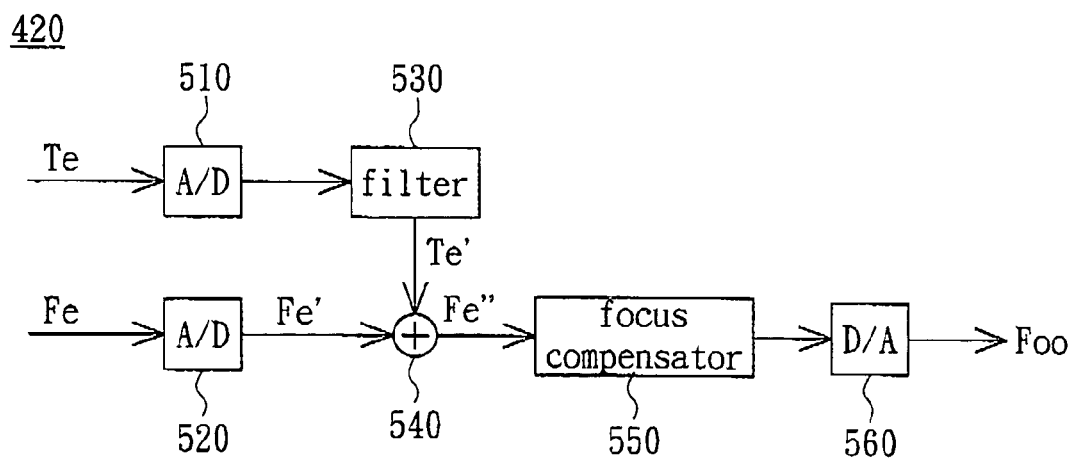
FIG. 5 is a diagram showing the focusing controller according to the preferred embodiment.

FIG. 5 shows a schematic diagram of the focusing controller according to the preferred embodiment, which basically includes an analog-to-digital converter (A/D converter) 510, 520, a filter 530, a coupler 540, a focus compensator 550 and a digital-to-analog converter (D/A converter) 560. The A/D converter 510 receives and digitizes the track error signal Te and outputs a digital track error signal. Similarly, the A/D converter 520 receives and digitizes the focus error signal Fe and outputs a digital focus error signal Fe'. Then, the filter 530 filters out the high-frequency component of the digital track error signal and thus derives an adjustment signal Te'. Please note that the filter 530, which is usually a low-pass filter, may adjust the amplitude of the track error signal Te after filtering out the high-frequency component of the track error signal such that a more regular low-frequency component is used for adjusting the signal Fe. Thereafter, the coupler 540 receives the digital focus error signal Fe' and the adjustment signal Te' and then derives a coupled signal Fe'' by eliminating the adjustment signal Te' from the digital focus error signal Fe'. The focus compensator 550 generates a compensation signal Foo' according to the coupled signal Fe", while the D/A converter 560 converts the compensation signal Foo' into analog format so as to form related focus control signal Foo at its output terminal for controlling position of the pickup head during focusing operations.

Figure 1:
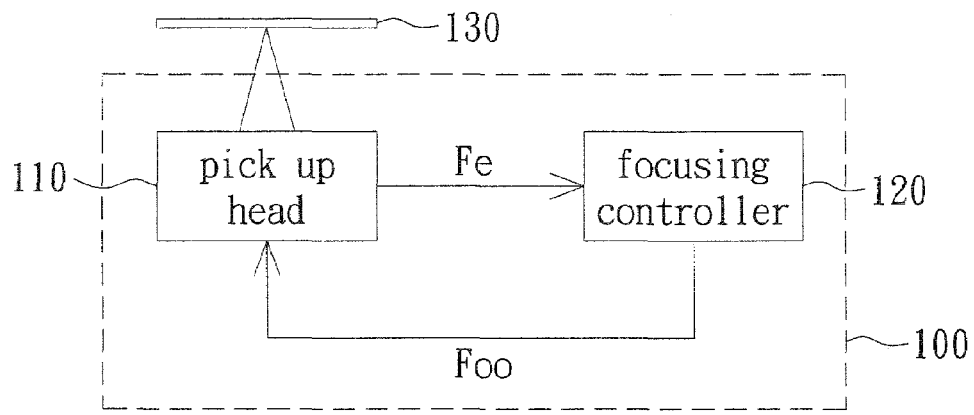
FIG. 1 is a block diagram showing a conventional optical disk drive.
Figure 2:
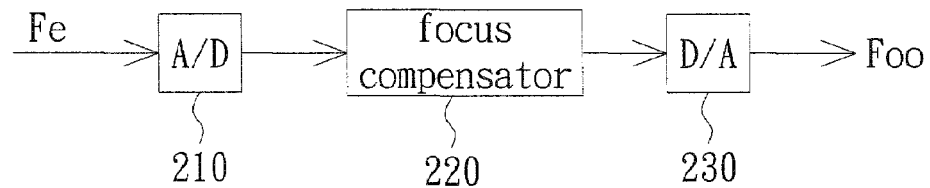
FIG. 2 is a block diagram showing the focusing controller.
Figure 3:
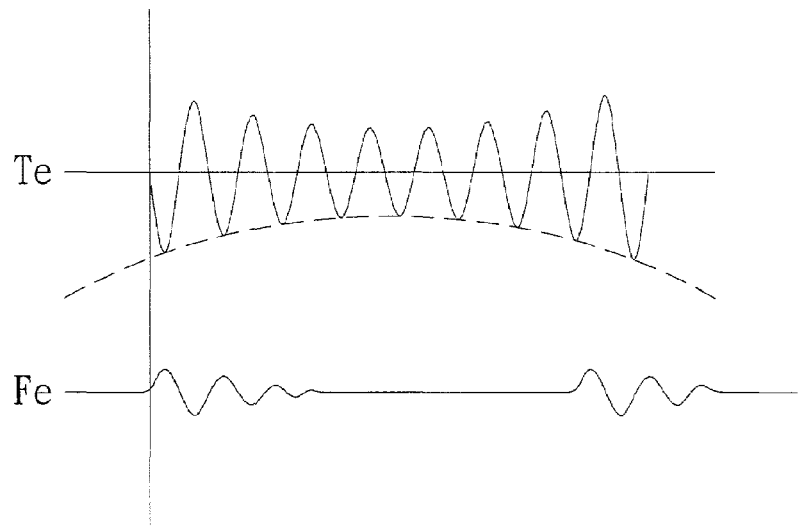
FIG. 3 shows waveform diagrams of the track error signal Te and the focus error signal during tracking.

The reason that convention focus error signal Fe can not reflect the precise focus status of the laser beam is that Fe couples a low-frequency error component from the low-frequency component of the track error signal Te as shown in FIG. 3. The filter 530 of the embodiment is introduced to filter out the high-frequency component of the track error signal Te so as to obtain required low-frequency component thereof, the adjustment signal Te'. The coupler 540 eliminates the low-frequency error component from the focus error signal Fe' according to the adjusted signal Te' such that the focus compensator 550 can get the accurate focus status of the laser beam to output the focus control signal Foo.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A focusing controller of an optical disk drive that receives a track error signal and a focus error signal used for deriving a focus control signal to control a position of a pick up head of the optical disk drive during a focusing operation, comprising:
   a filter which filters out a high-frequency component of the track error signal to derive an adjustment signal consisting of a low-frequency component of the track error signal;
   a coupler, which eliminates the adjustment signal from the focus error signal to generate a coupled signal; and
   a focus compensator, which derives the focus control signal according to the coupled signal to focus the pick up head on the optical disk.

2. The controller according to claim 1 wherein the filter adjusts the amplitude of the track error signal after filtering out the high-frequency component of the track error signal to output the adjusted signal.

3. A focusing controller of an optical disk drive that receives a track error signal and a focus error signal used for deriving a focus control signal to focus a pick up head on the optical disk drive during a focusing operation, comprising:
   a first analog-to-digital converter, which receives and digitizes the track error signal and outputs a digital track error signal;
   a second analog-to-digital converter, which receives and digitizes the focus error signal and outputs a digital focus error signal;
   a digital filter, which filters out a high-frequency component of the digital track error signal so as to derive an adjustment signal consisting of a low-frequency component of the digital track error signal;
   a coupler, which eliminates the adjustment signal from the digital focus error signal to generate a coupled signal;
   a focus compensator, which derives the focus control signal according to the coupled signal; and
   a digital-to-analog converter, which derives an analog focus control signal from the focus control signal, wherein the analog focus control signal is used to focus the pick up head on the optical disk.

4. The controller according to claim 3 wherein the filter adjusts the amplitude of the digital track error signal after filtering out the high-frequency component of the digital track error signal to output the adjustment signal.

5. A focusing control method that receives a track error signal and a focus error signal for deriving a focus control signal so as to focus a pick up head of an optical disk drive during a focusing operation, comprising:
   filtering out a high-frequency component of the track error signal to derive an adjustment signal consisting of a low-frequency component of the track error signal;
   eliminating the adjustment signal from the focusing error signal to generate a coupled signal; and
   deriving the focus control signal according to the coupled signal to focus the pick up head on the optical disk during the focusing operation.

6. The method according to claim 5 wherein the filtering step further adjusts the amplitude of the track error signal after filtering out the high-frequency component of the track error signal to output the adjusted signal.

* * * * *